United States Patent
Krueger et al.

(10) Patent No.: US 8,918,754 B2
(45) Date of Patent: Dec. 23, 2014

(54) SOFTWARE CUSTOMIZATION SYSTEM AND METHOD

(75) Inventors: Charles W. Krueger, Austin, TX (US); Mark N. Jungman, Cedar Park, TX (US)

(73) Assignee: BigLever Software, Inc., Austin, TX (US)

( * ) Notice: Subject to any disclaimer, the term of this patent is extended or adjusted under 35 U.S.C. 154(b) by 0 days.

(21) Appl. No.: 13/410,360

(22) Filed: Mar. 2, 2012

(65) Prior Publication Data

US 2012/0167038 A1   Jun. 28, 2012

Related U.S. Application Data

(63) Continuation of application No. 12/273,352, filed on Nov. 18, 2008, now Pat. No. 8,156,470, which is a continuation of application No. 10/106,154, filed on Mar. 26, 2002, now Pat. No. 7,543,269.

(60) Provisional application No. 60/278,786, filed on Mar. 26, 2001.

(51) Int. Cl.
*G06F 9/44* (2006.01)
*G06F 9/445* (2006.01)

(52) U.S. Cl.
CPC ............. *G06F 9/44547* (2013.01); *G06F 8/61* (2013.01)
USPC ............ 717/104; 717/107; 717/114; 717/121

(58) Field of Classification Search
CPC ............. G06F 8/10; G06F 8/31; G06F 8/34; G06F 8/71
See application file for complete search history.

(56) References Cited

U.S. PATENT DOCUMENTS

| | | | | |
|---|---|---|---|---|
| 7,543,269 B2* | 6/2009 | Krueger et al. | | 717/107 |
| 7,647,579 B2* | 1/2010 | Drissi et al. | | 717/114 |
| 7,721,252 B2* | 5/2010 | Choi et al. | | 717/104 |
| 2004/0221267 A1* | 11/2004 | Chase et al. | | 717/121 |
| 2005/0071806 A1* | 3/2005 | Sreedhar | | 717/104 |
| 2005/0166178 A1* | 7/2005 | Masticola et al. | | 717/104 |

OTHER PUBLICATIONS

Fraunhofer IESE, Software Product Lines: Economics, Architectures, and Implications, Jun. 2000, 175 pages.*
Savolainen et al., Violatility analysis framework for product lines, May 2001, 9 pages.*
Tiley et al., Empirical study of implementing product line practices in a software-producing organisation, Sep. 2002, 1 page.*
Aoyama et al., Continuous and discontinuous software evolution: aspects of software evolution across multiple product lines, Sep. 2001, 4 pages.*
J. Bosch, Software product lines: organizational alternatives, Jul. 2001, 10 pages.*

* cited by examiner

*Primary Examiner* — Thuy Dao
(74) *Attorney, Agent, or Firm* — William D. Wiese; DuBois, Bryant & Campbell LLP

(57) ABSTRACT

A system and method for the mass customization of software includes a software production line infrastructure, development environment, and actuator. The infrastructure organizes the software production line using a feature declarations component, a product definitions component, an automatons component, and a partition composition component. The development environment browses, displays, organizes, edits, and maintains the infrastructure. The actuator actuates the software production line to produce custom software products.

10 Claims, 10 Drawing Sheets

SOFTWARE CUSTOMIZATION SYSTEM AND METHOD

CROSS-REFERENCE TO RELATED APPLICATION

The present application is a continuation application of U.S. patent application Ser. No. 12/273,352 filed Nov. 18, 2008, now U.S. Pat. No. 8,156,470, in the name of Charles W. Krueger and Mark Jungman, entitled "Software Customization System and Method", which is a continuation of U.S. patent application Ser. No. 10/106,154 filed Mar. 26, 2002, now U.S. Pat. No. 7,543,269, in the name of Charles W. Krueger and Mark Jungman, entitled "Software Customization System and Method," which claims priority from and incorporates by reference prior U.S. Provisional Patent Application No. 60/278,786, filed Mar. 26, 2001.

BACKGROUND OF THE INVENTION

1. Field

The present invention pertains to the creation of software; more particularly, the present invention pertains to the creation of individual software products that are part of a software product family using a software production line.

2. Background

A software product family is a collection of almost-alike individual software products, each of which individual software product has some unique features and some common features found in all of the individual software products within the software product family. Software product families are typically created to satisfy a common need shared by many customers or market segments while at the same time accommodating the unique requirements of individual customers or market segments for a specially tailored individual software product.

Most software development organizations have a need to create and maintain multiple nearly-identical software systems. For example, a mobile phone manufacturer may have to produce hundreds of individual variations of the software which operates its handsets, one software variation for each handset model and wireless service provider used by the handset. Although most of the software for the hundreds of combinations of handsets and wireless service providers is virtually identical, each individual software product has small, but extremely important, variations which enable the operation of different handset features with the different features offered by the available array of wireless service providers.

Conventional approaches to developing individual software products have focused on creating and maintaining a one-of-a-kind software product rather than creating a family of nearly identical software products. Accordingly, the use of conventional approaches to create software product families including nearly-identical, but individualized, software products has been costly, slow, and often prone to errors.

One approach to reducing cost, speeding up the process of software creation, and reducing errors in the creation of software product families is the process of software mass customization. The process of software mass customization focuses on the means for efficiently producing and maintaining multiple similar software products, exploiting what the multiple similar software products have in common, and managing the differences among the individual software products. A better understanding of the process of software mass customization can be had by making an analogy to the automotive industry. In the automotive industry, the manufacturing of automobiles focuses on the use of a single production line to produce multiple similar variations of a particular car model. The powerful, though subtle, essence of this analogy to the production of multiple similar cars is the focus on a singular means of production for software rather than focusing on the creation of many similar individual software products. Once a process of software mass customization has been established, the actual production of the individual software products is more a matter of automated instantiation to create multiple individual software products efficiently rather than making the many small programming language changes associated with the manual creation of each individual software product in a software product family.

Actual success stories of the use of software mass customization techniques exist in such diverse areas as the software used with mobile phones, e-commerce, computer printers, diesel engines, telecom networks, enterprise software, cars, ships, and airplanes. The software system associated with each one of these examples relies on creating and maintaining a collection of individual but similar software products. By using the process of software mass customization to exploit what their individual software products have in common and to effectively manage the variation between their various software programs, companies have seen the potential for major reductions in time-to-market, engineering overhead and error rates in the creation of new almost-alike individual software products.

Many of the companies who have had success with the use of software mass customization techniques have also reported that the process of software mass customization continues to present formidable technical challenges. Accordingly, the complexity associated with the process of software mass customization results in large adoption times and efforts for establishing new software production lines.

Newcomers to the process of software mass customization often believe that the process involves simply building a single software system and then building a collection of small variations within the single software system using tools and techniques developed for the creation of special use software products. To date, however, no formal tools or techniques for building and managing a large and diverse collection of small variations in the individual software products in a software product family have been developed.

One attempt to solving the problem of building and managing a collection of small variations for a software product line includes the reliance on informally contrived solutions such as preprocessors (for example, IFDEF's), file naming conventions, directory structure conventions, configuration files, build directives, assembly scripts, install scripts, and parallel configuration management branches. It has been found, however, that these informally contrived solutions are not scalable; specifically, they are not manageable beyond a small number of software product variations. Moreover, these informal solutions are code-level mechanisms that are poorly suited for the expression of product-level constraints.

The problem remains, therefore, to create a robust system and method for the creation of individual software products in a software product family. The desired system and method must provide for the building and managing of a large collection of small variations among a group of individual software products within the software product family. The desired system and method should also minimize technical complexity, maximize reuse of existing software, present a low cost to the software developer, be easy to adopt, and enable the rapid production of individual software products that are part of a software product family.

SUMMARY

The disclosed system and method for software mass customization provides a software developer the tools and techniques for building and managing a collection of small variations among individual software products which are part of a software product family. Technical complexity, adoption effort, and production times are minimized by the present invention while at the same time maximizing reuse of existing software.

The disclosed system and method for software mass customization enables the creation of a software production line. Specifically, the present invention includes an infrastructure which allows all files and directories for a software product family to be stored unmodified in a common structure for all individual software products within the software product family. Common data files and data file directories for the individual software products are stored "as is" using conventional files and directories. For the data files and data file directories which vary among the individual software products, a new construct is used. This new construct is called an automaton and has two forms, a file automaton and a directory automaton. The construct of an automaton is introduced to augment the conventional notion of data files and data file directories. A file automaton is a virtual data file that actually appears as a different data file in each of the different software products. Similarly, a directory automaton is a virtual data file directory which can appear as a different data file directory in each of the individual software products within the software product family.

Each file automaton or directory automaton contains an executable description for creating a real data file or real data file directory in place of the virtual data file or virtual data file directory it represents within the individual software product. This executable description of the file automaton or directory automaton is called the automaton logic. The process of executing the automaton logic to create a real data file or a real data file directory in place of the virtual data file or virtual data file directory is called automaton actuation.

The automaton logic or the executable description for creating a real data file or a real data file directory is parameterized. Parameterization of the automaton logic allows different real data files or different real data file directories to be produced upon automaton actuation with different parameter values. All of the various file automatons or directory automatons are actuated with a given set of parameter values to produce each individual software product in the software product family. Because each file automaton or each directory automaton encapsulates everything needed to actuate itself, the file automatons and the directory automatons are called self-configuring automatons.

With each self-configuring automaton, the automaton logic for selecting or constructing the different variants is stored externally from the software artifacts. That is, the self-configuring software mass customization infrastructure does not require the contents of the source files and directories to be modified or for the automaton logic to be inserted into the source files and directories.

Accordingly, the disclosed system and method enables software developers who create individual software products that are part of a software product family to create and maintain a product line of individualized software products with the efficiency of mass production.

DESCRIPTION OF THE DRAWING FIGURES

A better understanding of the present invention may be had by reference to the drawing figures wherein.

DESCRIPTION OF THE EMBODIMENTS

Figure 1:
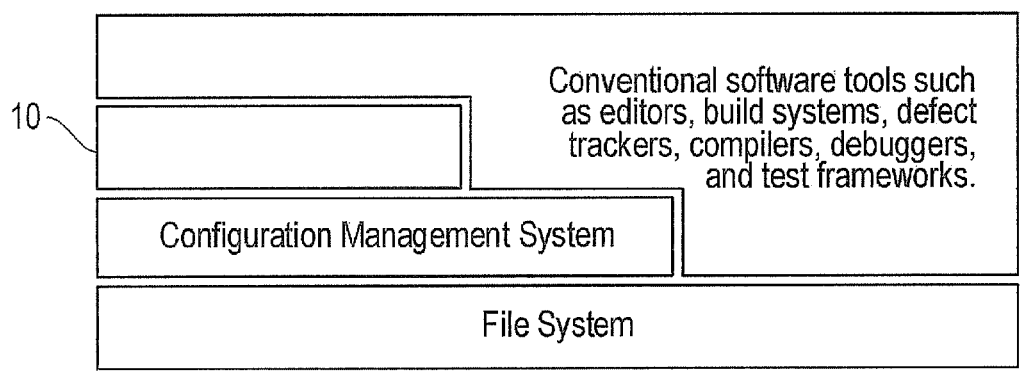
FIG. 1 is a schematic diagram showing the relationship of the disclosed software mass customization system and method to conventional software technology development layers.

The disclosed system and method for software mass customization brings together and expands on the two basic tenets of software mass customization which are: i) individualized software products, and ii) the efficiency of mass production. Unlike prior art software mass customization systems, the disclosed system and method for software mass customization focuses on the improvement provided by the mass production aspect of creating individualized software products rather than on the manual creation of each individual software product in a software product family and the improvement provided by augmenting existing technology and software with software mass customization support rather than requiring existing technology and software to be replaced.

In a macro sense, the disclosed system and method for software mass customization is based on an infrastructure which includes the following components:

i) Parameterized file and directory automatons which represent virtual data files and virtual data file directories that vary from individual software product to individual software product within a software product family. Each parameterized file or directory automaton represents a virtual data file or virtual data file directory and is inserted "in place" among the conventional data files and data file directories within the software artifacts common to the other individual software products in a software product family.

ii) A mechanism for actuating each file or directory automation by which each file or directory automaton receives parameter values and is thereby actuated to instantiate the appropriate real data file or real data file directory "in place" among the conventional data files and data file directories within the software artifacts common to the other individual software products in a software product family for the virtual data file or virtual data file directory represented by the automaton. Automaton actuation can be implemented in a variety of different ways: One way of automaton activation is to select from among a collection of existing files to present the real file. A second way of automaton actuation is to generate programming code from scratch. A third way is to transform existing source code into different forms. A fourth way is to instantiate patterns or frameworks. Those of ordinary skill in the art will understand that any combination of the enumerated ways of automaton actuation may also be used.

iii) A mechanism by which the parameters that can affect the behavior of each file or directory automaton can be declared.

iv) A mechanism for defining the parameter values that are used to actuate all of the file and directory automatons to produce an individual software product within a software product family. Each individual software product will have its own set of parameter values that will actuate each file or directory automaton to produce the desired real data files and real data file directories in place of the virtual data files and virtual data file directories.

A still better understanding of the disclosed system and method may be had from the following more detailed description. The infrastructure of the present invention and the development environment for creating a software mass customization production line is much like an automobile production line that is used to manufacture or produce customized variations of a single car model. Specifically, the disclosed system and method creates a single software production line out of which many customized variations of individual software products can be produced.

In an automobile production line, a chassis and drive train provide the basic structure to which is added a designated body style and optional features at predetermined locations. In the disclosed system and method, virtual data files and virtual data file directories are created. These virtual data files and virtual data file directories resemble the real data files and real data file directories which must be present in a finished software product for it to be operational, and they are convertible into the real data files and real data file directories which are present in a finished software product. Further, these virtual data files and virtual data file directories are incorporated in with the software artifacts on which a family of software products is based where the real data files and real data file directories are to be located in the finished software product. Inputs, according to a predetermined set of parameters, are provided to the virtual data files and virtual data file directories. These inputs create predetermined responses by the virtual data files and virtual data file directories. Such predetermined responses transform non-functional software including software artifacts, virtual data files, and virtual data file directories into a functional software product including software artifacts, real data files, and real data file directories.

For example, consider a software developer that has manually created three different variations of a software product for three different customers or three different market segments. Because each individual software product customization was created under different production deadlines, three independent copies of the software product were created in parallel. However, the parallel maintenance of these three individual software products rapidly grows in complexity because bug fixes and upgrades have to be performed three times for three copies and because of the continuing demand for more and more customized variations of the basic software product.

According to the disclosed system and method, the three independent variations of the software product for three different customers or market segments would be consolidated into a single software mass customization production line. That portion of the software artifacts that is common among all three independent variations of the software product is factored out into a single copy. For that portion of the software artifacts that varies among the three independent software systems, the system and method of the present invention encapsulates into automatons the differences at the point of variation in the software artifacts, along with the logic descriptions, for choosing among the differences in the software artifacts at the time of production. In some prior art software mass customization systems, the variations are made by going back into a completed software product with the necessary changes to the programming code to customize an individual software product for a particular application.

By use of the disclosed system and method, each individual software product can now be produced using a single software production line. Specifically, the three individual software products described above can be easily assembled from the software production line. Maintaining and enhancing these and other software products is accomplished by modifying the software production line to accommodate new products, requirements, or defects in existing software products. A key difference of this invention from other prior art software mass customization techniques is the shift of focus from developing and maintaining three separate, individual software products to developing and maintaining a single production line for automatically instantiating individual software products.

Another key difference of this invention from other prior art software mass customization is that the disclosed system and method works at the granularity of the data files within a software program. By not intruding into existing data files within a software program, the disclosed system and method remains neutral to programming language, compilers, operating systems, and editors. Additionally, the disclosed system and method will work equally well with data files that contain source code, documentation, test cases, requirements, and even binary multimedia data files.

FIG. 1 illustrates where the disclosed software mass customization layer 10 fits in relative to conventional software technology development layers. At the bottom layer is the operating systems data file system. Configuration management will extend the operating system's data file system by providing management of data file and system versions that change over time. The disclosed system and method extends the operating system's data file system by providing mass customization of system versions that may vary at fixed points in time.

Accordingly, the present invention is a method for managing the variation that exists in a family of individual software products. Execution of the method begins by first creating a set of abstract dimensions in the variations in the software artifacts among each individual software product. Next, a characterization is made of where each individual software product in the family of related software products is with respect to the created set of abstract dimensions in the variations in the software artifacts. Third, the locales of variation of the software artifacts of each individual software product are identified and an automaton is created at each locale of variation. Within the automaton for each locale of variation, the variations of software artifacts are then characterized in terms of the abstract dimensions of variation so that they may be instantiated at the identified locales of variation of the software artifacts in each individual software product. Instantiation of a software product occurs by selecting an individual software product in the abstract dimensions of variation and actuating each automaton with this software product description.

Using the method disclosed in the foregoing paragraph, an individual software product may be customized for an anticipated variation in the functionality of that individual software product. Alternatively, the individual software product may be customized to respond to an unanticipated variation in the functionalities of an existing software product. Or, the existing software product may be customized by extracting, or reverse engineering, information from an existing software product.

The software product created by using the disclosed method will include all of the common data files and common data file directories from the software production line, plus real instantiations for each of the virtual data files and virtual data file directories which are located at the identified locales of variation within a software production line. The creation of a real data file or real data file directory is triggered using a given set of parameter values.

A still better understanding of the present invention may be had by understanding that the disclosed system and method includes a mass customization infrastructure, a mass customization development environment, and a mass customization actuator.

The infrastructure portion of the disclosed system and method structures the set of individual software products to be produced into a mass customization production line. The mass customization development environment of the disclosed system and method includes editors and browsers which display, create, modify, and maintain the product definitions, the automatons, the partition composition, and a collection of mass customization infrastructure and software artifacts for the software production line. The mass customization actuator then activates the software production line to produce individual software products.

The software mass customization infrastructure of the disclosed system and method has four major components. These components are feature declarations, product definitions, and automaton and partition composition.

Figure 2:
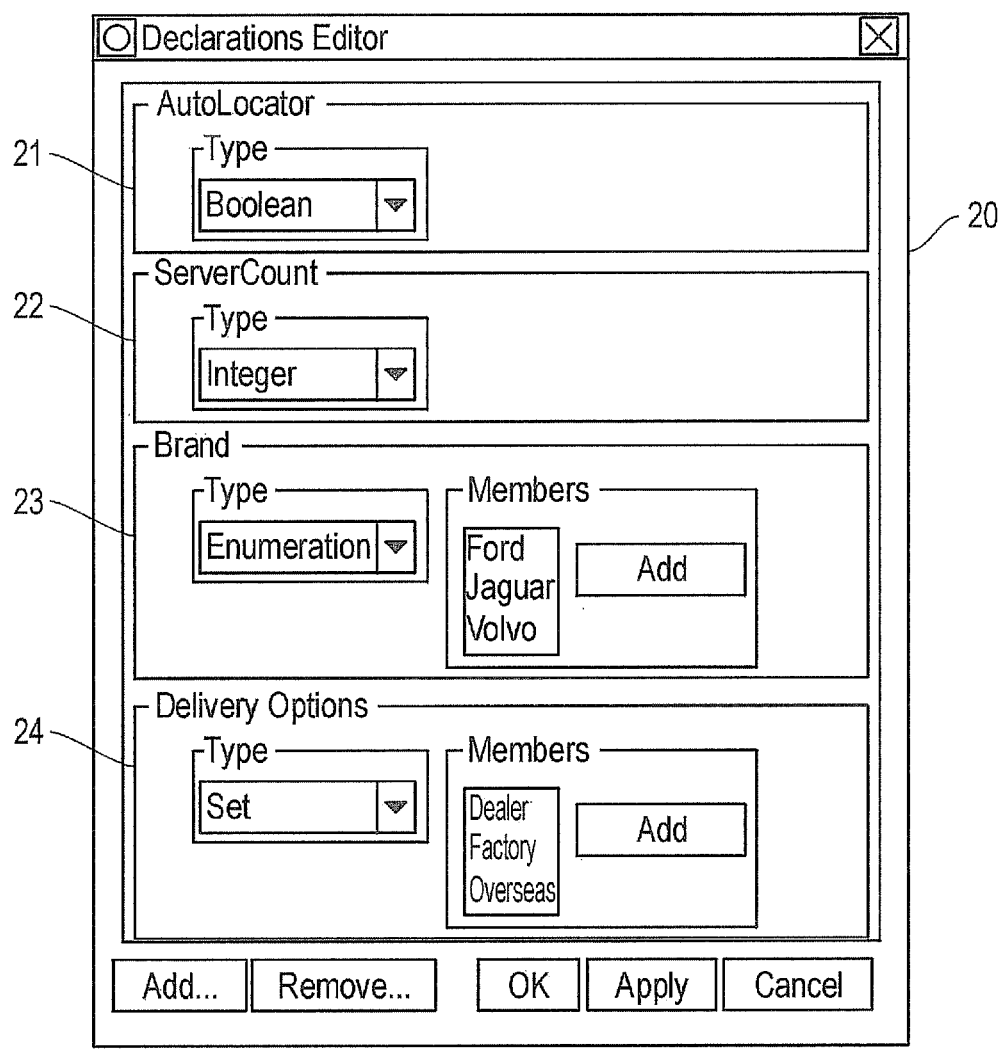
FIG. 2 is an edit screen from the software development environment showing a collection of product features.

The feature declarations component models the scope or dimensions of variation that can be used in the software production line. FIG. 2 displays a feature declaration editor 20 from the software development environment which includes a collection of feature declarations in the mass customization infrastructure. As shown in FIG. 2, there are declarations of four features 21, 22, 23 and 24 that can vary in the software production line, which, as shown in FIG. 2, is an automotive e-commerce website. Specifically, the auto locator Feature 21 in FIG. 2 is a boolean parameter which indicates whether or not an automobile locator feature is available. The server count Feature 22 indicates how many servers are configured. The brand Feature 23 indicates the automotive brand for the site, and the delivery options Feature 24 indicates which delivery options are supported by this particular website.

Figure 3:
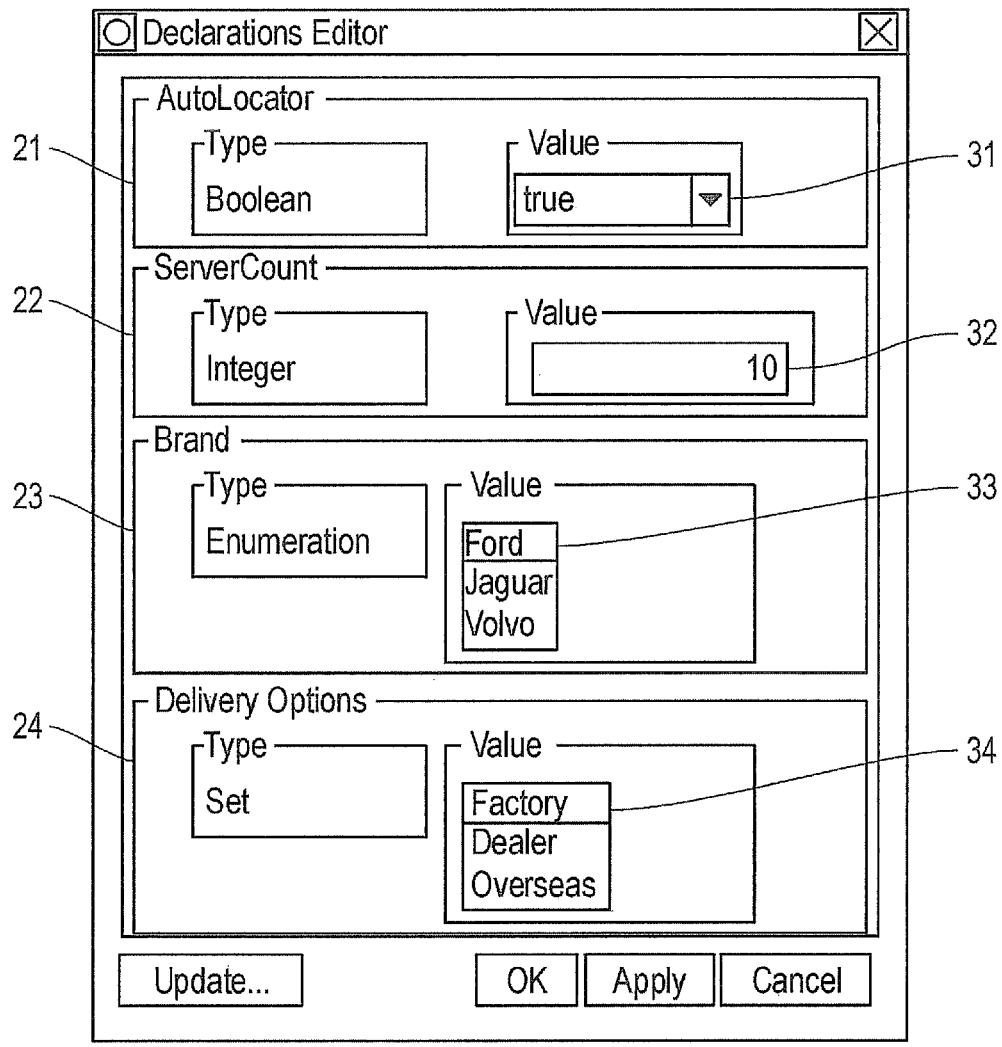
FIG. 3 is an edit screen, similar to FIG. 2 from the software development environment showing a product definition.

The product definitions component models the individual software products that can be created from the software production line. As shown in FIG. 3, there is an editor 30 from the development environment showing a product definition in the infrastructure. Values are selected for each feature declaration 21, 22, 23 and 24 shown in FIG. 2, indicating the desired customized feature desired in the end product. The software product in this example will include the auto locator 31, will operate on a 10-server configuration 32, will display the Ford brand of vehicles 33, and will support factory and dealer delivery options 34.

Figure 4:
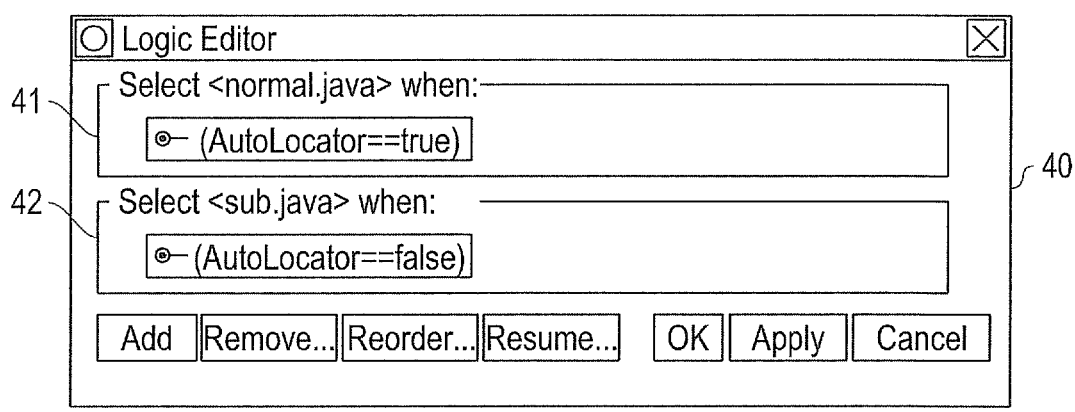
FIG. 4 is an edit screen from the development environment which views the automaton logic.

The automatons component encapsulates software artifact variants that exist in the software production line and the automaton logic for selecting among the variants. Shown in FIG. 4 is a logic editor 40 from the development environment of the disclosed system and method, which views the automaton logic and instantiates an individual automaton by actuation with a product definition. In the illustrated example, the automaton logic selects among two file variants, normal.java 41 and stub.java 42, depending on the value of the boolean feature declaration auto locator.

The partition composition component models the combination of partition customization that can be composed in the software production line.

The automaton actuator portion of the present invention is responsible for configuring an individual software product from the source files, declarations, definitions, and automatons in a software production line. Specifically, the automaton actuator configures an individual software product according to a selected product definition by actuating each automaton in the software production line with product definition. For example, if the automaton actuator were applied for the Ford product definition, as shown in FIG. 3, the automaton logic shown in FIG. 4 would be activated to select the normal.java variant since the auto locator value is defined as true. By actuating all of the automatons in a software production line, a complete individualized software product with all desired custom features can be configured. The disclosed system and method for creating individual software products in a software product family can be used according to any one of three individual approaches described below.

Figure 5:
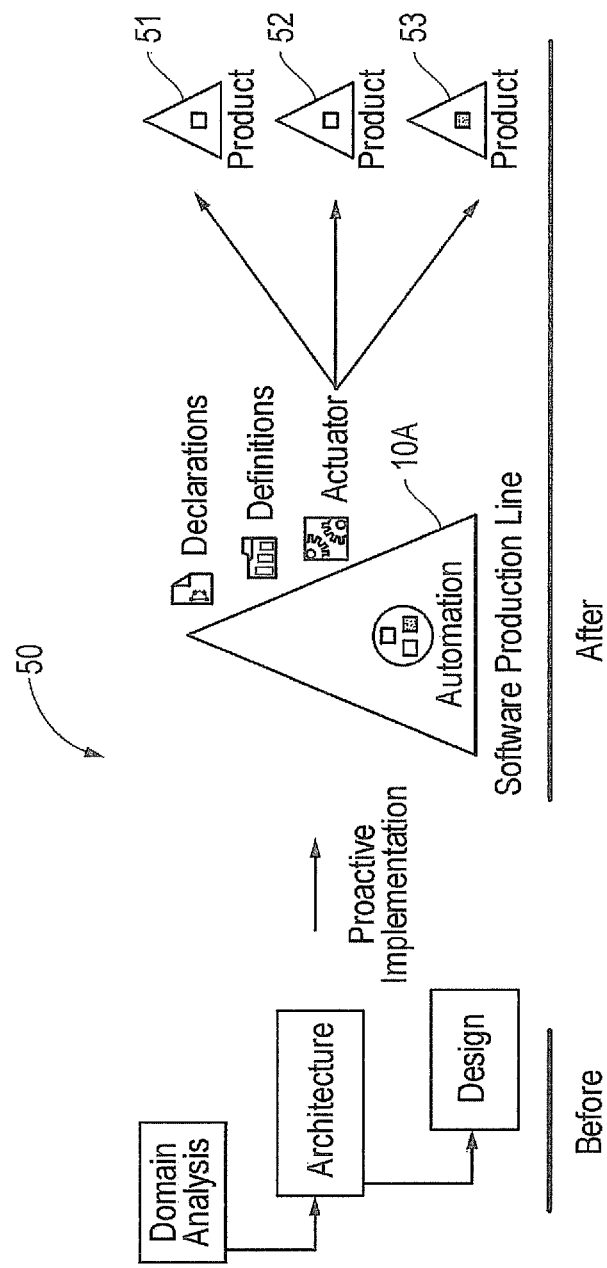
FIG. 5 is a schematic diagram of the high level tasks for the proactive approach.

The first approach for using the software mass customization system and method of the present invention is the proactive approach shown in FIG. 5. In the proactive approach, a software developer analyzes, designs, and implements a complete software mass customization production line 10A to support the full scope of individual software products needed in the foreseeable future. From the domain analysis and design, a complete set of common and varying software artifacts, feature declarations, product definitions, and automatons are implemented by the software production line 10A to produce individual software products 51, 52 and 53.

Figure 6:
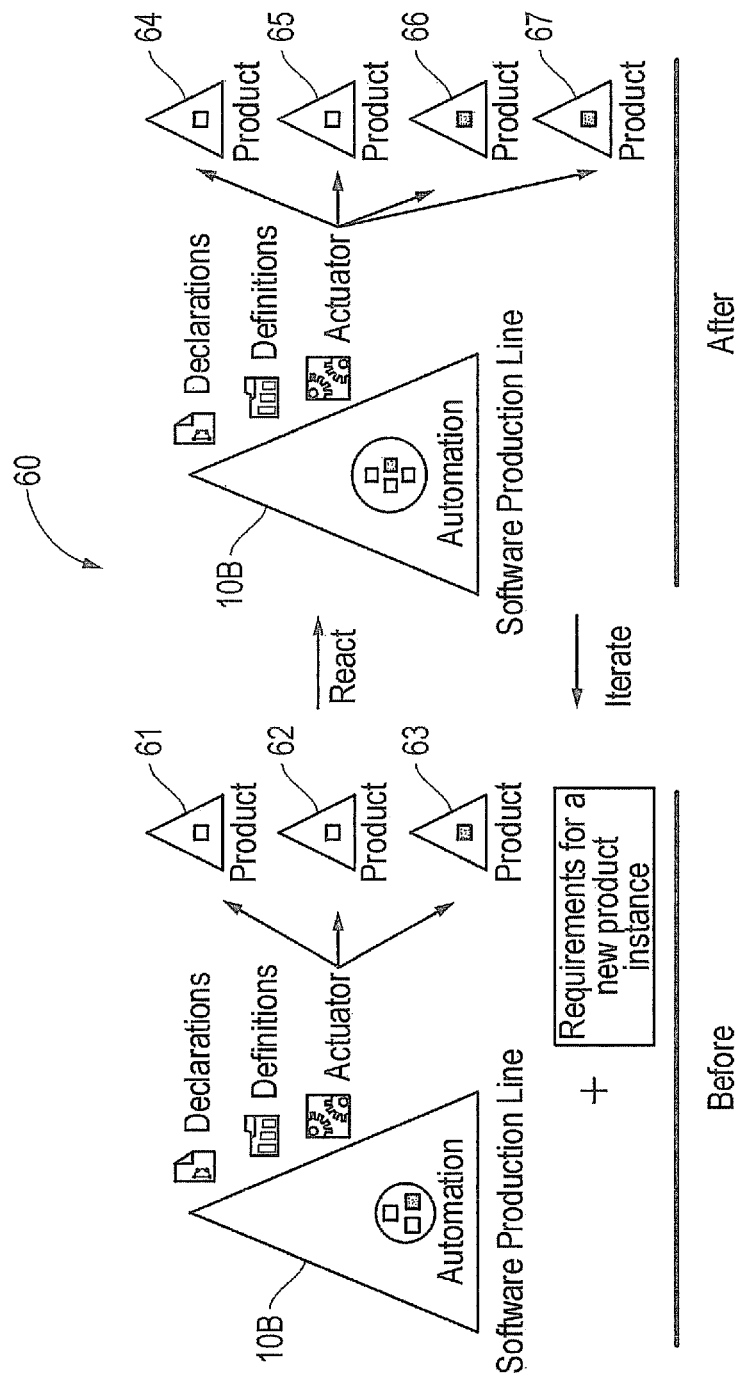
FIG. 6 is a schematic diagram of the high level tasks for the reactive approach.

The second approach 60 for using the software mass customization system and method of the present invention is called the reactive approach as shown in FIG. 6. In the reactive approach, a software developer incrementally grows its software mass customization production line 10B according to the demand for new individual software products 64, 65, 66 and 67 and new requirements for existing software products 61, 62 and 63. Common and varying software artifacts, along with the feature declarations, product definitions, and automatons, are incrementally extended in reaction to the new software requirements. This incremental approach offers a quicker and less expensive path into software mass customization.

The third approach 70 for using the software mass customization system and method of the present invention is called the extractive approach. In the extractive approach, the software developer capitalizes on existing customized software systems 71, 72 and 73 by extracting common and varying software artifacts into a single software production line 10C. In the extractive approach, the feature declarations, software product definitions, and automatons are created as the variations in the source code are identified during the extraction. This high level of software re-use enables a software developer to very quickly adopt a software mass customization process to produce individual software products 74, 75 and 76.

The foregoing three approaches for use of the disclosed system and method are not mutually exclusive. For example, another approach is to bootstrap a software mass customization effort using the extractive approach followed by use of the reactive approach to incrementally evolve the software production line over time.

A more detailed explanation of the proactive, reactive and extractive approach for using the disclosed invention follows.

The proactive approach 50 to software mass customization shown in FIG. 5 is similar to the waterfall approach for the creation of single software systems. The use of the proactive approach 50 is appropriate when the requirements for the set of individual software products needed, extending to the far future, are well defined and stable. The proactive approach 50 requires considerable up front effort; however, this up front effort drops off sharply once the creation of the software production line has been completed.

The high level tasks for the proactive approach 50 are as illustrated in FIG. 5, specifically:

1. Perform a domain analysis and scoping to identify the software artifact variation to be supported in the software production line.
2. Model the production line architecture to support all individual software products in the software production line.
3. Design the common and variant parts of the individual software product.
4. Implement the common and variant parts of each individual software product using the declarations, definitions, and automatons of the disclosed system and method.

Once the software production line 10A has been implemented, all that remains is to create individual software products 51, 52 and 53 as needed. Using this proactive approach 50, if new software products are needed, they can be created by simply adding a new software product definition into the infrastructure of the software production line 10A. Maintenance and evolution are performed directly on the single software production line 10A.

The second or reactive approach 60 to software mass customization shown in FIG. 6 is an incremental approach. Use of the reactive approach 60 is appropriate when the requirement for new individual software products 64, 65, 66, and 67 in the software product family is somewhat unpredictable. For example, when unexpected software requirements from new buyers of software are common, the reactive approach 60 should be used. The reactive approach 60 allows for a rapid adoption of mass customization since a minimum number of individual software products are incorporated in advance.

The high level tasks for incrementally adding a new product using the reactive approach are:

1. Characterize the requirements for the new individual software products relative to what is currently supported in the software production line 10B.
2. Determine if the new individual software products are currently within the scope of the current software production line 10B. If so, skip to step 4. If not, proceed to step 3.
3. If the new individual software products are not within the scope of the current software production line 10B, then perform the "delta engineering" to the software production line 10B on any or all of the declarations, automatons, common software, and definitions to extend the scope of the current software production line 10B to include the new individual software product requirements.
4. Create the software product definition for the new individual software products by selecting values for each of the feature declaration parameters.

Figure 7:
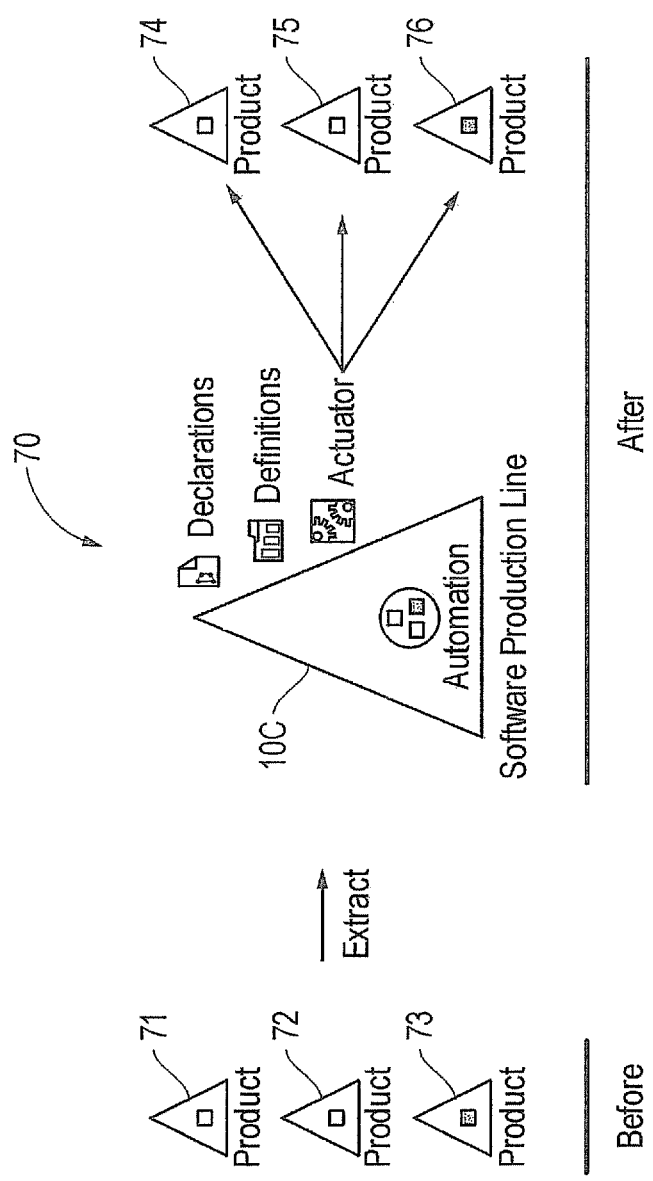
FIG. 7 is a schematic diagram of the high level tasks for the extractive approach.

Use of the third or extractive approach 70 shown in FIG. 7 to the software mass customization is appropriate when there is an existing collection of customized individual software products 71, 72 and 73 that need to be reused for new software products 74, 75 and 76. It is most appropriate when the collection of individual software products 71, 72 and 73 has a significant amount of commonality and the differences among them are consistent.

It is not necessary to perform the extractive approach 70 to software mass customization for all of the pre-existing individual software products 71, 72 and 73 at once. For example, a subset of the high-payoff, actively used individual software products might be extracted initially, and then the remainder of individual software products incrementally extracted as needed.

The tasks associated with the extractive approach 70 are as follows:

1. Identify commonality and variation in the existing individual software products 71, 72 and 73.
2. Factor the commonality and variations into a single software production line 10C by:
   a. Creating a single copy of the common software;
   b. Creating feature declarations that model the scope of variation among the existing software products;
   c. Encapsulate variation points into the automatons;
   d. Program the automaton logic to map declaration parameter values to variant selections in the automatons;
   e. Create the software product definitions for the desired individual software products by selecting values for each of the individual software product feature definition parameters.

After the software production line has been populated, individual software products are created as needed using the automaton actuator. Mass customization of individual software products now becomes the mode of operation, as the focus is shifted to maintaining and enhancing the single software production line.

One alternate embodiment of the disclosed invention may include two way automaton actuation. In two way automaton actuation the real data file or real data file directory that is presented in the place of the virtual data file or virtual data file directory during normal actuation can be subsequently modified by the software developer. The software developer can then run the automaton actuation in reverse to push any modification back into the automaton. The next automaton actuation will now include the modification.

Another alternative embodiment is based on the fact that the need for parameters used for an automaton in one area of an individual software product may be different from the parameters needed in another area of the software product. To prevent a large number of irrelevant parameters being available for all of the automatons, the software product can be partitioned into scopes such that only a subset of parameters apply to the automatons in each partition. A description for the assembly of custom partitions into a custom product instance is required for this alternative embodiment.

There are multiple alternative embodiments for automaton containers. Each automaton encapsulates logic and different source code variants for actuating different real files and real data file directories in place of the virtual data files and virtual data file directories. An automaton container can be implemented in a variety of different ways. Examples of implementing an automaton container include the use of a conventional directory, encoding all of the automaton information in a single file, extending a file system to implement the automaton concept, and extending a configuration management system to implement the automaton concept.

OPERATIONAL EXAMPLES

For a still better understanding of the system and method of the present invention, consider a company which develops e-commerce software for retailers. One of the retailers sells bicycles; a second retailer sells wedding rings; and a third retailer sells pianos. As between the three retailers, they sell products into Europe, into the United States, and into Canada. Each of the three retailers wants a website where buyers can order and pay for the particular product ordered. One of the three retailers wants a website to offer a "shopping cart" service where buyers can temporarily "store" purchases between Internet purchasing sessions. The other retailers do not want this feature on their websites. Some of the three retailers want their products delivered to a dealer for pickup; while others desire to offer pickup of the purchased product at the factory.

The first step to producing individualized software products meeting the needs of the three retailers in the example using the present invention is to enumerate the individual software products offered to the retailers and the ways that they differ. For example, a software developer may have different retailers who want to use different websites. The websites will vary by the merchandise being sold, for example, bicycles, wedding rings, and pianos; the business location, for example, Europe, U.S., and Canada; whether the retailers offer a shopping cart service on their website; and the delivery arrangements for the retail product sold.

Figure 8:
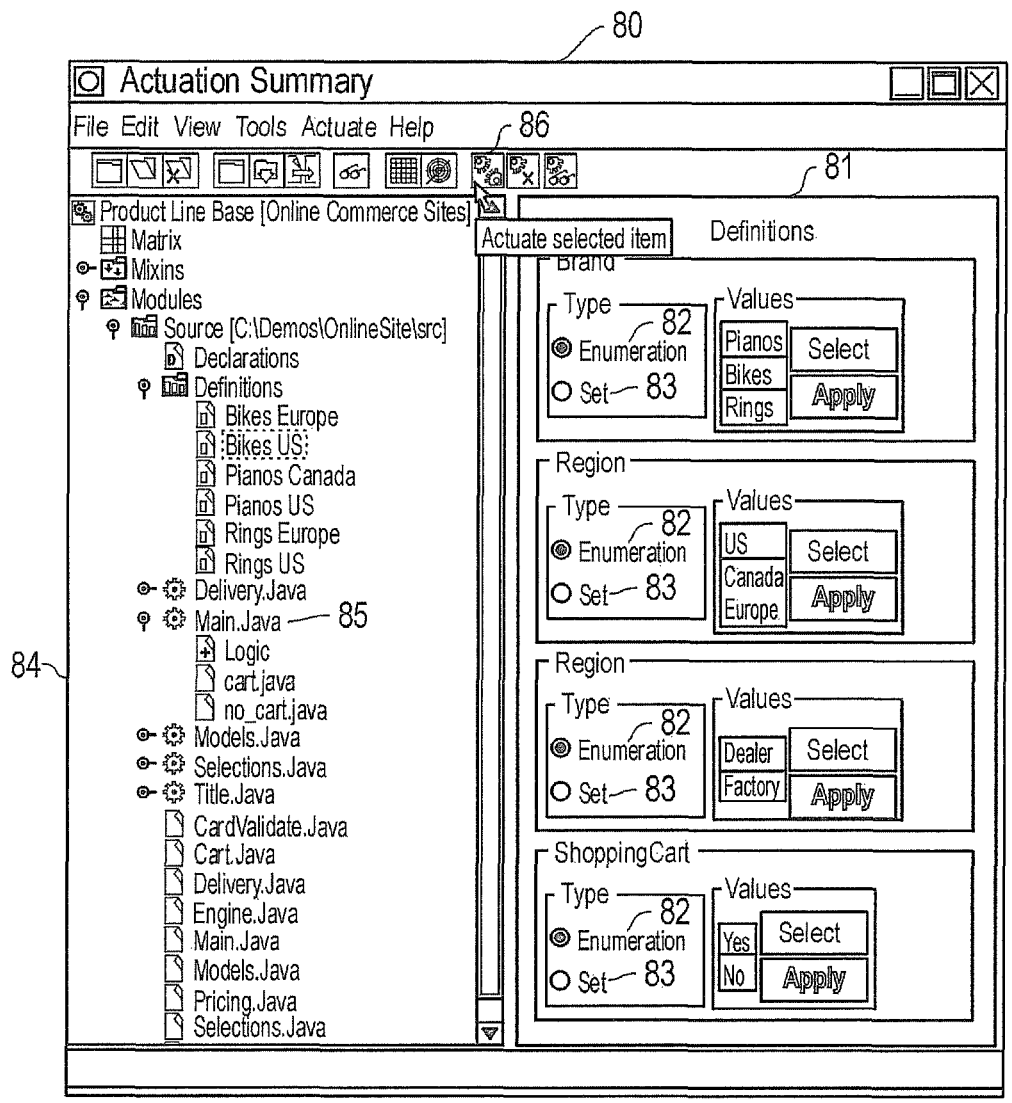
FIG. 8 is a browser screen from the software development environment.

To build each one of these individual software products, the software developer uses 20 different software components. Most of the components are common across all retail sales applications, such as that component which manages payment using an on-line credit card transaction. However, other components exist in different versions of the retail software product depending on how it is used. The second thing to be done is to list all of the common artifacts and all of the versions of the variant artifacts and then define what artifacts are used in each individual retail software product. Shown in FIG. 8 is a screen 80 displaying the software development environment. On the right side of the screen 81 are the feature declarations for the software production line. An enumerative variation 82 means that one value must be selected. A set variation 83 means 0 or more values can be chosen. On the left side of the screen 84 is the inventory of the product definitions and the software components that are included. The six products listed under Definitions begin with Bikes Europe and end with Rings, U.S. The five automatons that have different versions in the different software products are marked with a gear symbol. Note that automaton for main.java 85 is expanded, showing that it comes in two variants. The logic file contains the simple expression that associates each variant of the automaton with the combination of feature declarations that cause it to be selected for an individual software product. The complete list of common files that are included in all software products are in a list at the bottom of the left side of the screen 80.

Note that in FIG. 8, the entry "Bikes, U.S." is chosen. This means that the website that is going to be built is going to be for the retail sale of bicycles in the U.S. from a factory and where the website will offer a shopping cart feature.

As shown in FIG. 8, the "button" 86, under the arrow, to actuate the creation of the customized software product is about to be pressed. This causes the variants of all the automatons appropriate to "Bikes, U.S." to be made available in a workspace from which the customized individual retail software product can be built.

Figure 9:
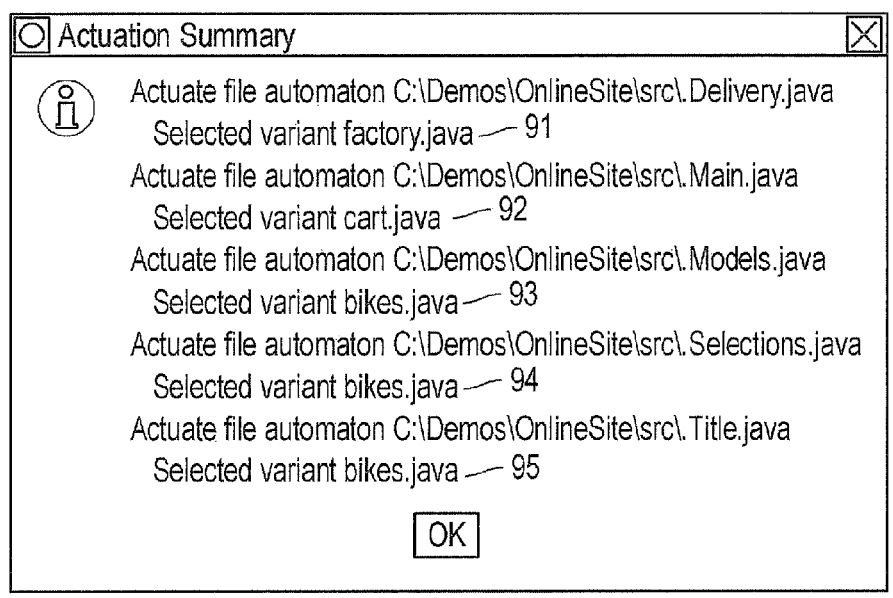
FIG. 9 is a schematic showing the creation of a customized software product.

FIG. 9 shows what happens when the actuation of the creation of the customized software product actually occurs. Note that the screen shows us which variants 91, 92, 93, 94 and 95 have been selected. Herein, the version of delivery file named "factory.java" 91 has been selected, and so forth. The software product associated with "Bikes, U.S." is now ready to be built.

The disclosed system and method is designed to be independent of the software developer's process for building software. Simply, the disclosed system and method supplies the correct files to build the customized software product, which can now be greatly simplified because all concerns about version selection are removed. The disclosed system and method is also independent of any CM tool because it is irrelevant where the data file versions come from. The language is independent; the disclosed system and method never modifies or even examines the source code. The "artifacts" actually do not have to be software at all. For example, the "artifacts" could be chapters in product line requirement specifications. For example, with almost no change, the foregoing description could have related to generating a requirements document for the "Bikes, U.S." retail software product.

The end result is that the disclosed system and method produces different individualized custom software products by assembling different collections of files, according to parameters that express possible customizations. As previously indicated, the assembling of different collections of files is accomplished as follows:

1. A software mass customization infrastructure consisting of special-purpose files and directories that are added to existing software to create a software mass customization production line.
2. A software mass customization development environment to browse, create, organize, and maintain the infrastructure for the software mass customization production line.
3. A software mass customization actuator to activate the software mass customization production line to produce custom individual software products.

Figure 10:
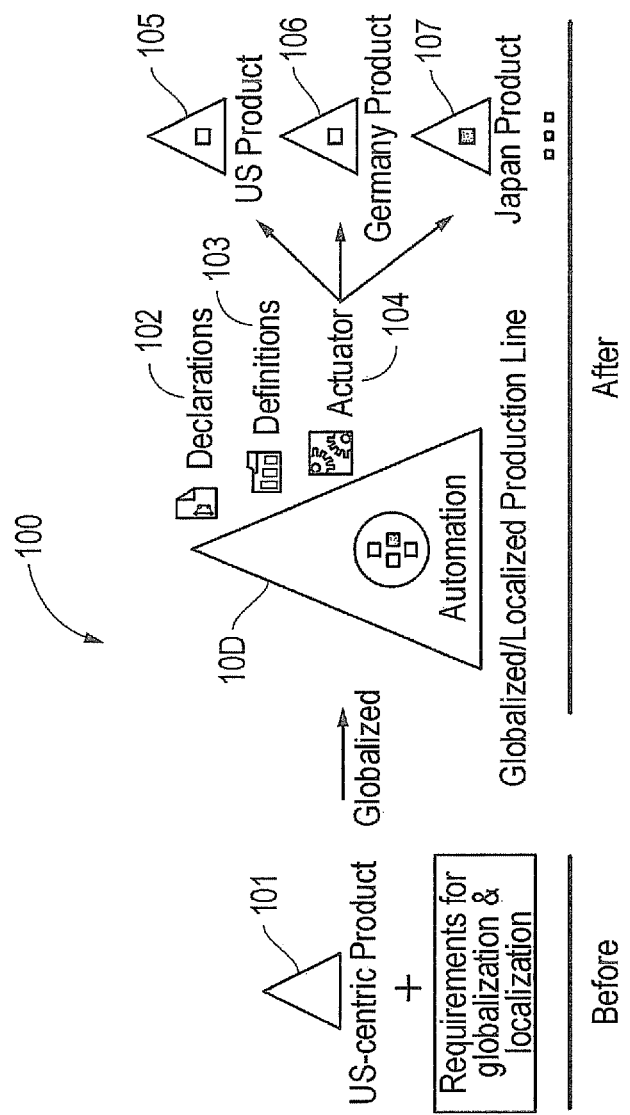
FIG. 10 is a schematic diagram of the high level tasks associated with the creation of a Globalization/Localization Software Production Line.

A second example illustrates how the disclosed system and method is used for globalization and localization, or internationalization, of a U.S.-Centric software system as shown in FIG. 10.

This example is best understood by understanding that a U.S.-Centric software product line 101 can be viewed as a software production line 10D with no variants. That is, the US-Centric software product 101 can serve as the initial basis for the creation of the software production line 10D. The process is begun by directing the disclosed system and method to create a new software production line 10D and thereby point to the root of the US-Centric software product source tree. The disclosed system and method creates the initial infrastructure for the software production line and creates empty declarations and definitions. The US-Centric software product is now a software production line 10D according to the disclosed system and method.

Next, the key globalization dimensions of variation for the software production lines are declared 102. These dimensions may come from a combination of industry standards, company standards, and from an analysis that is specific to the software product and its targeted customer base. Typically, a system architect is responsible for creating and maintaining the declarations for a software production line.

Globalization values that may be declared include:
An enumeration of specific countries to include which countries will be selected for individual software products;
A set of religions that potential users may belong to;
A boolean variable indicating whether or not to use European currency or local currency;
An integer variable expressing a taxation code;

An enumeration or string that models the language of dialect for textual display;

A character to model diplomatic status or possible immunities of a user group;

An enumeration to model the citizenship of the users, such as U.S. citizens working in a foreign country.

If the initial target collection of localized individual software products is known initially, these can be defined using the product definition editor 103. A named product definition is created for each individual software product to be instantiated from the software production line.

The task of defining a software product simply consists of selecting a value for each of the feature declarations.

The task of creating a software product definition is typically created by a system architect.

The next step is to enter the source base of the US-Centric software product where US specific areas are identified in the source code that must be generalized to support other locales.

The files that need to be globalized are converted from common files to automatons using the disclosed system and method. For example, a timesheet form in a US application may have an overflow area to compute overtime hours worked, where in Germany this same form must provide a warning when the legal maximum number of hours worked during a week is being approached rather than flowing into overtime. These two time sheet variants can be encapsulated into a single timesheet automaton. The logic description in this automaton is then programmed to select among the US and German file variants using the declaration variable and values.

After the declarations, definitions, and automatons have been created to form a complete software mass customization production line, the localized software products 105, 106 and 107 for different regions can be produced. The actuation operation 104 of the disclosed system and method takes a software product definition as input and creates a corresponding software product as output.

After the software production line has been established, all maintenance and evolution of the software production line is performed on the single software production line rather than on individual software products. For example, a bug fixed once in common software artifact is then fixed for all individual software products produced by the production line. As requirements for new locales are introduced, the declarations, definitions, and automatons are incrementally extended as necessary, thereby the entire software production line evolves as a whole in configuration management so that one can always go to the software production line to reactuate and reproduce any product that was previously shipped.

Those of ordinary skill in the art will understand that numerous other embodiments of the foregoing invention are enabled by this disclosure. Such other embodiments shall fall within the scope and meaning of the appended claims.

What is claimed is:

1. A method executed by a processor for managing the variation in the software artifacts that exist in a family of related software products, said method comprising the steps of:
   creating a set of abstract dimensions of variation corresponding to a set of desired actual variations among the individual software products in the family of related software products;
   characterizing where each individual software product in the family of related software products is with respect to said set of abstract dimensions of variation;
   identifying locales of variation in the software artifacts in the family of related software products;
   characterizing how said set of abstract dimensions of variations are used to instantiate said identified various locales of variation to produce the individual software products and generating said identified various locales of variation to produce the individual software products based on said set of abstract dimensions.

2. The method as defined in claim 1 further including the step of customizing individual software products for all anticipated variations in the functionalities of said family of related software products.

3. The method as defined in claim 1 further including the step of customizing individual software products to respond to unanticipated variations in the functionalities of said family of related software products.

4. The method as defined in claim 1 further including the step of customizing individual software products by extracting, or reverse engineering, information from an existing collection of software products.

5. A system having a processor for engineering individual software products within a family of related software products, said system comprising:
   means for creating a set of abstract dimensions of variation in the family of related software products corresponding to a set of desired actual variations;
   means for characterizing where each individual software product in the family of related software products is with respect to said set of abstract dimension of variations;
   means for identifying locales of variation in the software artifacts for the individual software products within the family of related software products;
   means for characterizing how said set of abstract dimensions of variations are used to instantiate the said identified locales of variation.

6. A method executed by a processor for mass customization of computer software comprising the steps of:
   creating virtual data files and virtual data file directories that are convertible into real data files and real data file directories, said virtual data files and virtual data file directories being capable of converting into real data files and real data file directories in response to predetermined inputs;
   incorporating said virtual data files and said virtual data file directories within the software artifacts in a family of related software products;
   providing said predetermined inputs to said virtual data files and said virtual data file directories to actuate predetermined responses by said virtual data files and said virtual data file directories;
   utilizing said predetermined responses to create a customized software product based on said software artifacts and including real data files and real data file directories.

7. The method as defined in claim 6 where said virtual data files and said virtual data file directories functionalities are selected from a group including: generating additional programming language, selecting from an existing collection of said software artifacts, transforming existing programming language from within said software artifacts, and instantiating patterns or frameworks.

8. The method as defined in claim 6 wherein said virtual data files and virtual data file directories are located in said software artifacts where said real data file and said real data file directories are instantiated.

9. The method as defined in claim 6 wherein said predetermined inputs to said virtual data files and said virtual data file directories are defined by a set of parameter values.

10. A customized software product stored in a memory made according to the method as defined in claim 6.

\* \* \* \* \*